Figure 1:
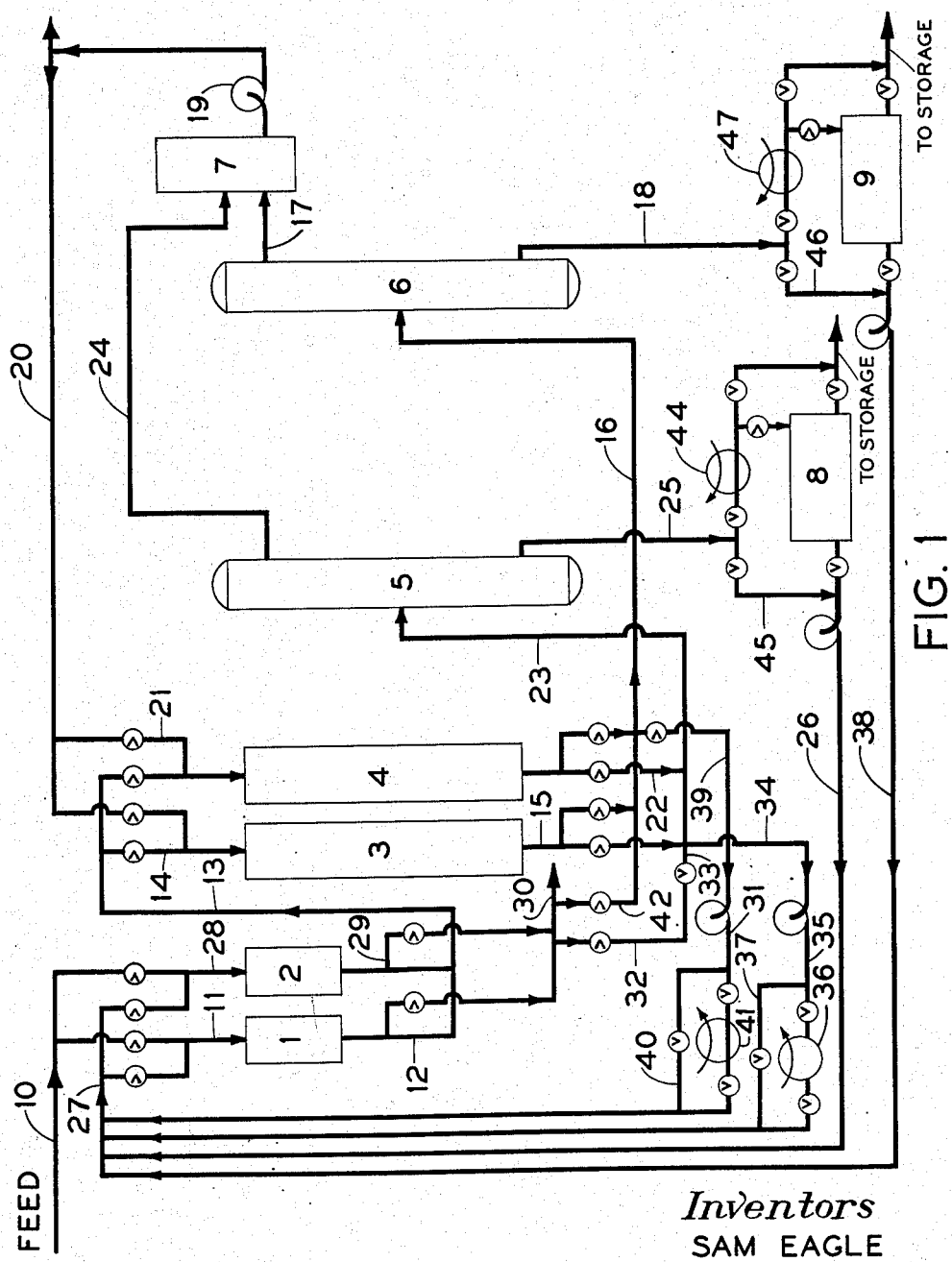

Feb. 17, 1953  S. EAGLE ET AL  2,628,933
REGENERATION OF SOLID ADSORBENTS
Filed March 21, 1949  2 SHEETS—SHEET 1

Inventors
SAM EAGLE
JOHN W. SCOTT JR.

Attorneys or Agents

Inventors
SAM EAGLE
JOHN W. SCOTT JR.

Patented Feb. 17, 1953

2,628,933

UNITED STATES PATENT OFFICE 2,628,933

REGENERATION OF SOLID ADSORBENTS

Sam Eagle, Richmond, and John W. Scott, Jr., Berkeley, Calif., assignors to California Research Corporation, San Francisco, Calif., a corporation of Delaware Application March 21, 1949, Serial No. 82,678

20 Claims. (Cl. 196—147)

The present invention relates to an improved method for separating liquid organic mixtures by preferential adsorption on a solid adsorbent. More particularly, the invention relates to a novel method of regeneration of a portion of solid adsorbent employed in the process.

In the simplest embodiment of a process for separating organic liquid mixtures by preferential adsorption, a two-stage cyclic process is employed. In the first stage, a liquid feed is contacted with a solid adsorbent in an adsorption zone to separate an adsorbate and a percolate, and in the second stage the adsorbate is removed from the adsorbent and the adsorbent is regenerated for reuse.

The organic mixtures which are separated by this method are often not amenable to separation by more conventional methods such as distillation. Petroleum distillates having broad boiling ranges may be separated to obtain fractions consisting predominantly of one type of organic compound. For example, kerosene may be separated into an aromatic fraction and a paraffinic fraction, catalytically reformed naphtha may be separated into an aromatic adsorbate and a non-aromatic percolate, and cracked naphtha may be processed to separate aromatic, olefinic, and paraffinic fractions. Various mixtures which are not predominantly hydrocarbon may be separated by selective adsorption; for example, the reaction products of the Fischer-Tropsch synthesis and of the Oxo process which contain substantial amounts of oxygenated organic compounds may be separated into an oxygenated compound fraction and a hydrocarbon fraction. Complex mixtures such as those above constitute the usual feeds to adsorption separation processes employing silica gel, alumina gel, silica alumina gel and similar adsorbents. These feeds ordinarily contain minor amounts of highly polar compounds, such as organic nitrogen, oxygen, and sulfur compounds, polyolefins and dissolved water, which are all very strongly adsorbed on these adsorbents and which are not completely removed from the adsorbent in the main regeneration stage of the process and such compounds are hereinafter referred to by the term "non-aromatic polar compounds." Through successive cycles of operation these polar compounds accumulate on the adsorbent, reducing its capacity to effect the desired separation of the constituents of the feed which are present in major proportions. For example, the polar compounds contained in kerosene rapidly exhaust the capacity of the adsorbent to separate an aromatic adsorbate and a non-aromatic percolate. The exhaustion of the adsorbent requires either frequent replacement or frequent severe regeneration treatments adapted to remove the polar compounds from the adsorbent.

It is desirable that these minor proportions of very strongly adsorbed compounds be removed from the feed mixture prior to its passage into the adsorption zone. This may be accomplished by providing a guard chamber or guard zone filled with a mass of solid adsorbent or selectivity similar to the adsorbent employed in the adsorption zone, and passing the feed through the guard zone prior to its passage through the adsorption zone. The content of very strongly adsorbed components in mixtures such as petroleum distillates is ordinarily low; for example, in a straight run kerosene distillate they do not ordinarily exceed 0.2% by weight, while the aromatic components which may be removed by adsorption amount to as much as 20–25% by weight. The quantity of adsorbent in the guard zone may accordingly be much smaller than that in the adsorption zone and a large quantity of feed may be put through the guard zone before regeneration is required.

In the case of silica gel the highly polar compounds present in minor proportions in the feed are most strongly adsorbed and the guard zone is packed with an adsorbent having a higher selectivity for these polar compounds than for any other component of the feed. Silica gel itself may be used or other adsorbents showing the same kind of selectivity as silica gel, such as alumina gel or silica-alumina gel may be employed. Where a different type of adsorbent such as adsorbent carbon is employed in the adsorption zone its activity decline, when feeding petroleum distillates, is produced by polynuclear aromatics. The guard zone in this case is packed with adsorbent carbon or another adsorbent which is more selective for polynuclear aromatics than for any other component of the feed.

The removal of very strongly adsorbed compounds from a solid adsorbent and the regeneration of the adsorbent is difficult and constitutes a process step which is significant in the overall economy of the adsorption process. These compounds cannot usually be desorbed by heating alone because of their instability and high boiling points. They have been removed in the case of silica and alumina gels by washing the adsorbent with a highly polar desorbent material, such as methanol or acetone, and the adsorbent has then been regenerated for reuse by heating to remove the desorbent. Such a method of removal has several serious inherent disadvantages. A system for desorbent recovery and purification must be provided, and adsorbent attrition is high due to adsorption fracture caused by contacting the adsorbent with such very strongly adsorbed materials. There is additional attrition due to thermal fracture when the adsorbent is heated to drive off the desorbent, and due to fragmentation caused by boiling the desorbent from the pores of the adsorbent. Further, it is usually necessary to provide internal coils within the mass of adsorbent or special gas preheaters in order to supply sufficient heat to the mass to vaporize the desorbent.

It is an object of this invention to provide a method for regenerating the adsorbent in the guard zone in which no strongly adsorbed desorbent is required.

It is a further object to provide a method for regenerating the adsorbent in the guard zone in which adsorbent attrition is substantially below that sustained where regeneration is effected by treatment with a strongly adsorbed desorbent followed by heating to remove the desorbent.

In the practice of the present invention the feed to the adsorption separation process is passed through a body of solid adsorbent in a guard zone to remove minor proportions of compounds which are very strongly adsorbed and then passed through a body of solid adsorbent in an adsorption zone to separate an adsorbate and a percolate. The adsorbate is removed from the adsorbent in the adsorption zone and that adsorbent is regenerated for reuse. Removal of the adsorbate may be effected by passing hot gas through the adsorbent, but it is preferably effected by stripping the adsorbate from the adsorbent by passing a stripping liquid, which is defined as an adsorbable liquid which is less strongly adsorbed than the adsorbate, through the adsorption zone. When this preferred method is employed, a mixture of adsorbate and stripping liquid is recovered from the adsorbent during the regeneration stage and, since stripping liquid is resident in the adsorption zone at the end of the regeneration stage, a mixture of percolate and stripping liquid is recovered from the adsorption zone during the succeeding adsorption stage. Both the adsorbate-stripping liquid mixture and the percolate-stripping liquid mixture are usually distilled to separate the adsorbate and percolate from the mixtures and to recover the stripping liquid for reuse. The adsorbent in the guard zone is regenerated periodically by contacting it with at least a part of one of the liquids recovered from the adsorption zone during the cycle. It may be regenerated by contact with the adsorbate-stripping liquid mixture, by contact with the percolate-stripping liquid mixture, or by contact with either the adsorbate or percolate after they have been separated from their respective mixtures with stripping liquid by distillation.

The invention may be more clearly illustrated by reference to the appended drawings, both of which are diagrammatic representations of apparatus and process flow patterns suitable for the practice of the invention. Referring to Figure 1, vessels 1 and 2 are guard chambers packed with a solid adsorbent and connected for parallel flow; vessels 3 and 4 are adsorption columns packed with a solid adsorbent and connected for parallel flow. Distillation columns 5 and 6 are employed to separate adsorbate-stripping liquid mixtures and percolate-stripping liquid mixtures, respectively. Storage tanks 7, 8 and 9 are for stripping liquid, adsorbate and percolate, respectively.

Operation during a typical cycle in the separation of aromatics from catalytically reformed naphtha, employing silica gel as the adsorbent in both the guard chambers and adsorption columns and using pentane as the stripping liquid, is as follows:

The naphtha is passed through lines 10 and 11 into guard chamber 1 where strongly adsorbed polar compounds are removed. The naphtha passes from guard chamber 1 through lines 12, 13 and 14 into adsorption column 3 where the aromatic components of the naphtha are adsorbed. A non-aromatic percolate flows from adsorption column 3 through lines 15 and 16. Pentane resident in column 3 at the end of the regeneration stage of the preceding cycle flows from column 3 with the non-aromatic percolate. The percolate-pentane mixture flows through line 16 to distillation column 6 where pentane is removed as the overhead and flows through line 17 into pentane storage tank 7 while the percolate is removed as still bottoms and flows through line 18 to storage tank 9. While the adsorbent masses 1 and 3 are on stream in the manner described, masses 2 and 4 are being regenerated in the following manner:

Pentane is pumped from tank 7 by pump 19 through lines 20 and 21 into column 4. The pentane is preferably heated to about 200°–250° F. by means not shown, for more efficient stripping. A mixture of pentane and the aromatic adsorbate flows from column 4 through lines 22 and 23 into distillation column 5. Pentane is removed from column 5 as overhead and passes through line 24 to pentane storage tank 7. The aromatic adsorbate is removed from column 5 as the bottoms product and passes through line 25 and adsorbate cooler 44 into adsorbate storage tank 9 or through line 45 depending on the stage of the cycle. In the stage now in illustration hot adsorbate is pumped from line 45 through lines 26, 27 and 28 into guard chamber 2. Adsorbate containing desorbed polar compounds flows from guard chamber 2 through lines 29 and 30 to storage. If maintenance of an adequate volume of adsorbate in tank 8 makes it necessary, a part of the adsorbate may be returned from line 30 through cooler 44 to tank 8. Operation in this manner is continued until the capacity of the adsorbent in column 3 to separate aromatics from the feed is nearly exhausted and the adsorbent in column 4 has been regenerated. When these conditions have been reached, the flow of feed is diverted from exhausted column 3 to regenerated column 4 and the flow of pentane is diverted from column 4 to column 3. The feed continues to be passed through guard zone 1 during a number of cycles in which columns 3 and 4 are alternately on stream. The precise number of cycles will depend upon the content of highly polar compounds in the feed and upon the relative sizes and capacities of the masses of adsorbent in the columns 1 and 2 of the guard zones and columns 3 and 4 of the adsorption zones. When the capacity of the adsorbent in guard chamber 1 to remove highly polar compounds from the feed is exhausted and the adsorbent in the guard chamber 2 has been regenerated the flow of hot adsorbate from line 25 is diverted from chamber 2 to chamber 1 and the feed flow is diverted from chamber 1 to chamber 2. Just prior to diverting feed flow from chamber 1 to chamber 2, the flow of hot still bottoms from line 25 to column 2 is discontinued and cold adsorbate from tank 8 is passed through lines 26, 27 and 28 into guard chamber 2 to cool the adsorbent prior to introducing feed into chamber 2.

When the adsorbent in gaurd chamber 2 has been cooled the flow of feed is diverted from chamber 1 to chamber 2. Since chamber 2, at the end of the cooling period, is filled with cold adsorbate, the first effluent from chamber 2 when feed is introduced consists of substantially pure adsorbate. This first effluent is removed from chamber 2 through lines 29 and 30 and sent to adsorbate storage. After the incoming feed has displaced the resident cold adsorbate from chamber 2 the effluent from chamber 2 is diverted from line 29 to line 13 through which it flows to the adsorption zone. Ordinarily 50 or more cycles are run in which the feed flow is alternately chamber 1 to column 3 and chamber 1 to column 4. When chamber 1 becomes exhausted, a like number of cycles are run in which the feed flow is alternately chamber 2 to column 3 and chamber 2 to column 4. During the running of the 2-3, 2-4 cycles, chamber 1 is regenerated.

Instead of regenerating the adsorbent in the guard chambers 1 and 2 by contacting it with hot adsorbate and cooling with cold adsorbate as described above, any of the following methods may be employed:

1. The liquid flowing to distillation column 5 consisting of adsorbate and stripping liquid may be withdrawn from line 23 via line 34 and pumped through line 35, heat exchanger 36 and line 27 into the chamber 1 or 2 which is to be regenerated. As the regeneration is completed and before the chamber undergoing regeneration is placed on stream, the liquid flowing through line 35 to the chamber being regenerated is diverted from heat exchanger 36 through by-pass 37. The liquid thus reaches the adsorbent cold and cools the adsorbent before it is again placed on stream. In some cases the feed to still 5 may be sufficiently hot for removal of polar compounds; heat exchanger 36 may then be by-passed for regeneration and be used as a cooler to cool the adsorbent at the end of the generation cycle.

2. Hot percolate from line 18 may be pumped through lines 46, 38 and 27 into chamber 1 or chamber 2 to regenerate the adsorbent. The liquid flowing from the chamber undergoing regeneration flows to storage via line 30; however, all of part of it may be returned to tank 9 through cooler 47. Before the regenerated adsorbent is placed on stream, it may be cooled by pumping cold percolate from tank 9 through lines 38 and 27 into the chamber being regenerated.

3. The adsorbent in chambers 1 and 2 may be regenerated by withdrawing from line 16 a part of the percolate-stripping liquid mixture flowing via line 16 to distillation column 6, passing the withdrawn liquid through lines 39, 31, heat exchanger 41 and line 27 into the chamber 1 or 2 to be regenerated. The effluent liquid from the chamber being regenerated flows through lines 42 and 16 to distillation column 6. When regeneration is complete, the liquid flowing to the chamber being regenerated is diverted from heat exchanger 41 through by-pass 40 so as to cool the adsorbent before putting it back on stream.

4. The combination of adsorbate still bottoms for hot regeneration and adsorbate still feed for cooling may be preferred and employed in some specific applications.

5. Likewise, the combination of percolate still bottoms for hot regeneration and percolate still feed for cooling may be preferred and employed in some specific cases.

Of the four streams which may be employed to regenerate the adsorbent in the guard zone, the first two are ordinarily preferred, i. e., either the adsorbate or the adsorbate-stripping liquid mixture. The preference is based on the facts that the adsorbate is more effective in desorbing the polar or strongly adsorbed compounds than is the percolate and that a large volume of adsorbate-stripping liquid mixture usually at about 200° F. is available for use in the regeneration of the guard zone adsorbent. However, the percolate or the percolate-stripping liquid mixture may be effectively employed for the purpose especially if they are at an elevated temperature of 200–500° F.

The presence of the desorbed polar compounds or strongly held materials in either the adsorbate or percolate removed from the process as a product is not ordinarily objectionable. In some instances it may be preferred to have this material present as an impurity in one of these products rather than in the other, and, in such instances, the liquid in which the polar compounds are least objectionable is used in regenerating the guard zone adsorbent.

The principle of the invention as above described with reference to a process in which two adsorption columns are alternately on stream and in regeneration as illustrated by Figure 1 may be advantageously employed in a cyclic adsorption process in which a plurality of fixed adsorbent beds are employed and substantially countercurrent contact of the adsorbent and feed is attained by systematically regrouping the adsorbent beds. Such a process is described in our copending application Serial No. 10,166.

Figure 2:
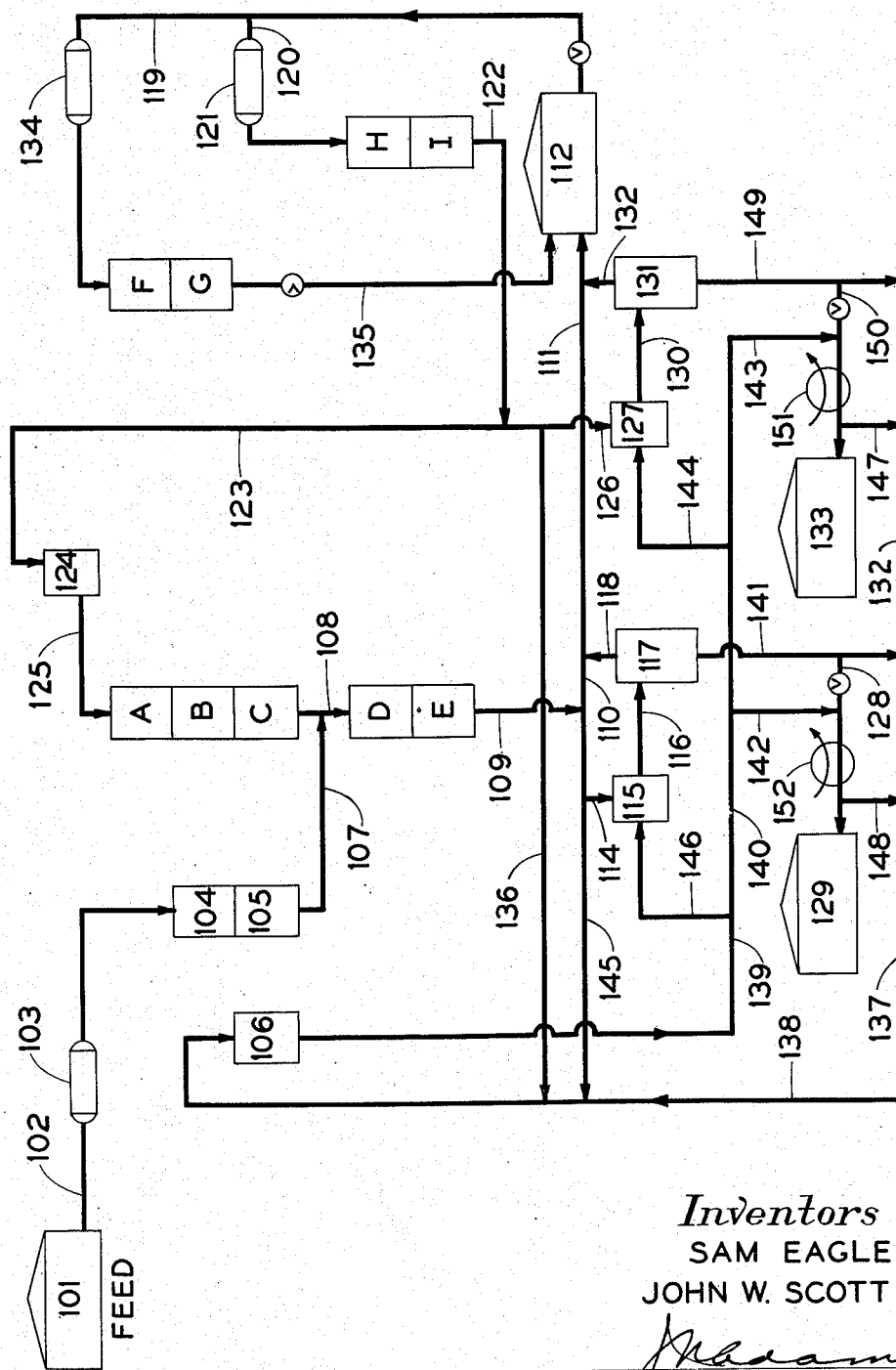

The practice of the invention in a cyclic adsorption process employing a plurality of fixed adsorbent beds and moving points of liquid introduction and withdrawal is diagrammatically illustrated by Figure 2 of the appended drawings in which the letters A to I inclusive represent fixed adsorbent beds of substantially uniform size. Each adsorbent bed will consist of a vessel packed with particle-form solid adsorbent material such as silica gel. Columns A, B and C are serially connected to constitute an adsorbate enriching zone, columns D and E are serially connected to constitute a percolate refining zone, columns H and I are serially connected to constitute a stripping zone and columns F and G are serially connected to constitute a cooling zone. Guard chambers 104, 105 and 106 are likewise vessels packed with a particle-form solid adsorbent which may be the same adsorbent as that in adsorption columns A to I inclusive or may be different in respect to either particle size or composition.

A liquid feed is passed from feed storage tank 101 through line 102 and drier 103 into serially connected guard chambers 104 and 105 where highly polar compounds contained in the feed are removed. The feed is passed from guard chamber 105 through line 107 into line 108 where it mingles with the effluent from the adsorbent enriching zone and passes through columns D and E where the preferentially adsorbable component of the feed is removed. The liquid effluent from column E during the first part of the cycle illustrated consists essentially of stripping liquid and is passed through lines 109, 110 and 111 into strippant storage tank 112. The effluent from column E during the latter part of the cycle illustrated consists of a mixture of stripping liquid and the non-preferentially adsorbable components of the feed, i. e., the percolate. This mixture passes through lines 109 and 114 into percolate surge drum 115 and then through line 116 into distillation column 117. The stripping liquid in the illustration is assumed to have a lower boiling point than the percolate and accordingly is taken from still 117 overhead through lines 118 and 111 to strippant storage tank 112. The bottoms from still 117 consist of percolate and flow through lines 141 and 128 to percolate storage tank 129. Stripping liquid is passed from strippant storage tank 112 through lines 119 and 120 and drier 121 into column H of the stripping zone. A heat exchanger is ordinarily provided in line 120 to heat the stripping liquid to a temperature of 200–500° F. prior to its passage into column H. The first liquid effluent from column I during the illustrated cycle consists of stripping liquid and adsorbate removed from the adsorbent in columns H and I and is passed through lines 122 and 123 into recycle surge drum 124 through line 125 into column A of the adsorbate enriching zone where it enriches the adsorbate by desorbing minor proportions of the non-preferentially adsorbable components of the feed, i. e., percolate, held on the adsorbent in columns A to C inclusive. The effluent liquid from column C consists predominantly of stripping liquid and percolate and flows from column C through line 108 into the percolate refining zone. During the latter part of the illustrated cycle the liquid effluent from column I, consisting of stripping liquid and adsorbate passes through lines 122 and 126 into adsorbate surge drum 127. The mixture of adsorbate and stripping liquid is passed from surge drum 127 through line 130 to distillation column 131 where stripping liquid is taken overhead and passes through lines 132 and 111 into strippant storage tank 112. The bottoms from still 131, consisting of adsorbate, pass through lines 149, 150 and cooler 151 to adsorbate storage tank 133. However, in the practice of this invention the adsorbate may be pumped while still hot through the guard chamber being regenerated, and then sent to storage in tank 133.

Strippant is passed through line 119 and dried 134 into column F of the cooling zone. The strippant is appropriately cooled to about 80° F. before introduction into column F. The effluent from column G, consisting of stripping liquid, passes through line 135 to strippant storage tank 112.

Guard chamber 106 is undergoing regeneration. As indicated above, any of the four liquids, adsorbate, percolate, adsorbate-stripping liquid or percolate-stripping liquid may be employed for the purpose of regenerating the adsorbent in the guard zone.

When adsorbate is employed it is withdrawn from the bottoms stream from still 131 and is passed through lines 149, 137 and 138 into guard chamber 106. The effluent from guard chamber 106 consisting of adsorbate and desorbed polar compounds flows through lines 139, 140, 143 and cooler 151 to adsorbate storage tank 133. When the polar compounds have been substantially removed, a stream of adsorbate is circulated through exchanger 151 and chamber 106 via lines 147, 132, 137, 138, 139, 140, and 143, in order to cool the adsorbent.

When percolate is used to regenerate the adsorbent in guard chamber 106, the bottoms stream is withdrawn from percolate still 117 through line 141 and is passed through lines 137 and 138 into guard chamber 106. The effluent from guard chamber 106 flows through lines 139, 140, 142 and cooler 152 to percolate storage tank 129. The adsorbent in the guard chamber is cooled, after the polar compounds have been removed, with percolate circulated through exchanger 152.

When adsorbate-stripping liquid mixture is used to regenerate the adsorbent in guard chamber 106, the mixture is withdrawn from column I and is passed through lines 122, 136 and 138 into guard chamber 106. The effluent from chamber 106 is returned via lines 139, 140, and 144 to surge drum 127.

When percolate-stripping liquid mixture is used to regenerate the adsorbent in chamber 106, the mixture is withdrawn from column E and is passed through lines 109, 145 and 138 into chamber 106. The effluent from chamber 106 is returned via lines 139 and 146 to surge drum 115.

The specific requirements of each application will dictate the advisability of heating or cooling these streams before passing them through the guard chamber in order to accomplish regeneration. In general a smaller volume of fluid is required to regenerate the adsorbent if the temperature is increased, presuming of course that the fluid is stable at the higher temperature. One of the advantages of this new method of guard chamber regeneration accrues from the large volumes of fluid available, so that much lower temperature must be attained during the regeneration than would be economical if a subsequent separation of the fluid and the polar materials were necessary.

Guard chamber 106 remains in regeneration without change in the flow of liquid through it during a number of adsorption cycles during which adsorption columns A to I inclusive are regrouped as they become spent or regenerated in the zone in which they are shown in Figure 2. For example, in the next succeeding cycle columns B, C and D will be interconnected to constitute the adsorbate refining zone, the recycle liquid from recycle surge drum 124 being introduced into column B, columns E and freshly regenerated and cooled column F will be interconnected to constitute the percolate refining zone, columns G and H will be interconnected to constitute the cooling zone and columns I and A will be interconnected to constitute the stripping zone.

After a number of such adsorption cycles have been run, for example fifty, the adsorbent in guard chamber 106 becomes regenerated and that in guard chamber 104 becomes exhausted. When this occurs regeneration of the adsorbent in guard chamber 104 is begun in the manner previously described for the regeneration of chamber 106, and the feed will be passed successively through guard chambers 105 and 106, to remove polar compounds. After another correspondingly large number of adsorption cycles guard chamber 105 becomes exhausted and guard chamber 104 becomes fully regenerated. Guard chamber 105 is then placed in regeneration and the feed is passed successively through guard chambers 106 and 104 to remove highly polar compounds. Where, for example, a guard chamber is in regeneration during fifty adsorption cycles, the adsorbent is cooled, if necessary, during the last several cycles in the manner described with reference to Figure 1, prior to being placed on stream.

A cyclic adsorption process similar to that illustrated in Figure 2 may be employed to separate three major components from a feed, for example, to separate an aromatic fraction, an olefinic fraction and a paraffinic fraction from cracked naphtha. In this operation an aromatic adsorbate is separated and the percolate is taken in two cuts, a paraffin-stripping liquid cut and an olefin-stripping cut. A third distillation column is then required. There are three still feeds, i. e. adsorbate-stripping liquid, olefinic-percolate-stripping liquid and paraffinic-percolate-stripping liquid, and three bottoms products, i. e. adsorbate, olefinic percolate, and paraffinic percolate. Any of these six liquids may be employed to regenerate the guard chamber adsorbent, the adsorbate and adsorbate-stripping liquid mixture usually being preferred.

The process of this invention is especially attractive as applied to a cyclic adsorption process as illustrated in Figure 2. One of the guard chambers is continuously in regeneration and where the adsorbate is used as the regeneration liquid it is taken directly from the bottom of still 131 at still bottom temperature and passed into the guard chamber which is in regeneration. The heat which must be expanded in any event to separate the adsorbate and stripping liquid is thus utilized in part in the guard chamber regeneration. A separate step of heating the adsorbate for use in guard chamber regeneration which would be required in a batch adsorption separation is avoided. A similar procedure is followed with a similar advantage when the percolate is employed to regenerate the guard zone adsorbent. Further, in the cyclic process illustrated in Figure 2, hot stripping liquid is continuously passed into the stripping zone to remove the adsorbate from the adsorbent and regenerate the adsorbent for reuse. In the cycle of operation illustrated in Figure 2, columns H and I constitute the stripping zone, in the succeeding cycle columns I and A will constitute the stripping zone; in each cycle two columns will constitute a stripping zone and hot stripping liquid will constantly be required for the stripping operation. In the embodiment of the invention shown in Figure 2 the overhead from both of stills 117 and 131 consists of hot stripping liquid which may be passed directly into the stripping zone. The heat which has necessarily been expended in the distillations may be further used in passing the hot stripping liquid overhead directly to the stripping zone.

The process of the invention may be illustrated by the separation of a kerosene distillate to produce an aromatic adsorbate and a non-aromatic percolate suitable for use as a lamp oil. An apparatus and process flow similar to that illustrated by Figure 2 may be employed for the separation; however, guard chamber 104 is eliminated and only two guard chambers are employed, one being on stream and the other being in regeneration. The kerosene feed is passed through guard chamber 105 into the percolate refining zone and guard chamber 106 is in regeneration. The adsorption cycles are 45 minutes in length and the guard chambers are alternately on stream and in regeneration for 50-hour periods. Guard chambers 105 and 106 are each packed with 10.8 pounds of 28–200 mesh silica gel and silica gel is employed as the adsorbent in columns A to I inclusive. The adsorbent in guard chamber 106 is regenerated by passing hot absorbate from adsorbate still 131 through it for a period of 45 hours and then passing cold adsorbate through it for a period of 5 hours. The stripping liquid employed is pentane. The hot adsorbate is at a temperature of 460° F. and the cold adsorbate is at a temperature of 80° F. The regeneration schedule is as follows:

Feed_____ Kerosene distillate
  Rate_____ 1.3 gal./adsorption cycle
Guard chamber 105:
  On stream_____ 50 hours
  Feed treated_____ 65 gals.
  Temp_____ 70° F.
Guard chamber 106:
  In regeneration___ 50 hours
  (a) Contacting with adsorbate—
      Temp_____ 460° F.
      Volume_____ 13 gals.
      Time_____ 45 hours
  (b) Flushing and cooling with cold adsorbate—
      Temp_____ 80° F.
      Volume_____ 6.5 gals.
      Time_____ 5 hours At the end of 50 hours guard chamber 106 is placed on stream and guard chamber 105 is regenerated according to the above schedule.

Inspections of the feed and adsorbate streams are as follows:

| | Feed | Adsorbate |
|---|---|---|
| API Gravity | 39.9 | 22.2 |
| Aniline Point | 132 | −45 |
| Boiling Range_____°F | 370–500 | |
| Percent Aromatics | 22 | 95 |
| Percent Paraffins and Naphthenes | 87.8 | 5.0 |
| Percent Polar compounds | 0.2 | 0.0 |

The stripping liquid employed in the above example was pentane; as indicated above the stripping liquid may be any adsorbable liquid which is miscible with the feed and less strongly adsorbed than the adsorbate. When petroleum distillates are separated by the process the stripping liquid is usually a paraffinic hydrocarbon boiling at a temperature below that of the distillate. However, a stripping liquid may be employed which has a higher boiling range than the feed in which case the stripping liquid is separated as the bottoms product when a stripping liquid-adsorbate or a stripping liquid-percolate mixture is separated.

When either the adsorbate-stripping liquid mixture or the percolate-stripping liquid mixture, effluent from the stripping zone and percolate refining zone, respectively, is used to regenerate the guard zone adsorbent, the mixture is usually heated to a temperature in the range of 200–500° F. prior to its passage into the guard zone. This heating is undertaken only when it is found necessary in order to regain the desired selectivity of guard chamber adsorbent with the volume of liquid available.

When either the adsorbate or the percolate is employed in regenerating the guard zone adsorbent, it is ordinarily used at the still bottom temperature although either may be further heated to increase desorbing effectiveness or cooled if there are compounds in the system which are unstable at higher temperatures. Subject to this stability limitation it is preferred to conduct the regeneration at moderately elevated temperatures, usually in the range of 200–500° F.

Preferred adsorbents for both the guard zone and the adsorption zone are normally silica gel, alumina gel, and silica-alumina gel. Other adsorbents, however, may be employed and the process of the invention may be advantageously employed in any process in which a guard zone is provided to protect the adsorbent in the adsorption zone from activity decline caused by accumulation of very strongly adsorbed compounds on it. The guard zone may be and ordinarily will be packed with the same adsorbent as that employed in the adsorption zone. However, different adsorbents may be used in the two zones provided that both adsorbents exhibit their greatest selectivity for the feed component, present in minor proportions, which tends to accumulate on the adsorbent in the adsorption zone and cause a decline in its activity.

We claim:

1. In an adsorption separation process wherein a mixture of liquid organic compounds containing a minor proportion of very strongly adsorbed non-aromatic polar compounds is contacted with a solid adsorbent in a guard zone to remove said strongly adsorbed compounds and wherein the effluent from the guard zone is thereafter separated into at least two fractions by contact with a solid adsorbent in an adsorption zone, the improved method of regenerating the adsorbent in the guard zone which comprises contacting said adsorbent with a liquid comprising at least a part of one of said fractions.

2. In a cyclic process wherein liquid mixtures of organic compounds containing minor proportions of very strongly adsorbed non-aromatic polar compounds are separated by contact with a solid adsorbent and the adsorbent is regenerated by contacting it with a stripping liquid, said process comprising a first step of passing said mixture into contact with a mass of solid adsorbent in an adsorption zone to separate an adsorbate comprised of the preferentially adsorbable components of the mixture and a first effluent liquid comprising the non-preferentially adsorbable components of the mixture and stripping liquid and a second step of passing the stripping liquid into contact with the mass of solid adsorbent in the adsorption zone to remove the adsorbate from the adsorbent producing a second effluent liquid comprising adsorbate and stripping liquid and simultaneously regenerating the adsorbent for reuse, the improved method which comprises providing an additional mass of adsorbent constituting a guard zone, passing the liquid mixture through the mass of solid adsorbent in the guard zone to remove the minor proportions of very strongly adsorbed compounds present in the mixture prior to its passage into the adsorption zone and periodically regenerating the adsorbent in the guard zone by contacting it with at least a portion of one of the effluent liquids from the adsorption zone.

3. In a cyclic process wherein liquid mixtures of organic compounds containing minor proportions of strongly adsorbed non-aromatic polar compounds are separated by contact with a solid adsorbent and the adsorbent is regenerated by contacting it with a stripping liquid, said process comprising a first step of passing said mixture into contact with a mass of solid adsorbent in an adsorption zone to separate an adsorbate comprised of the preferentially adsorbable components of the mixture and a first effluent liquid comprising the non-preferentially adsorbable components of the mixture and stripping liquid and a second step of passing a stripping liquid into contact with the mass of solid adsorbent in the adsorption zone to remove the adsorbate from the adsorbent producing a second effluent liquid comprising adsorbate and stripping liquid and simultaneously regenerating the adsorbent for reuse, the improved method which comprises providing an additional mass of solid adsorbent constituting a guard zone, passing the liquid mixture through the mass of solid adsorbent in the guard zone to remove the minor proportions of very strongly adsorbed compounds present in the mixture prior to its passage into the adsorption zone and periodically regenerating the adsorbent in the guard zone by contacting it with the second effluent liquid from the adsorption zone.

4. In a cyclic process wherein liquid mixture of organic compounds containing minor proportions of very strongly adsorbed non-aromatic polar compounds are separated by contact with a solid adsorbent and the adsorbent is regenerated by contacting it with a stripping liquid, said process comprising a first step of passing said mixture into contact with a mass of solid adsorbent in an adsorption zone to separate an adsorbate comprised of the preferentially adsorbable components of the mixture and a first effluent liquid comprising the non-preferentially adsorbable components of the mixture and stripping liquid and a second step of passing a stripping liquid into contact with the mass of solid adsorbent in the adsorption zone to remove the adsorbate from the adsorbent producing a second effluent liquid comprising adsorbate and stripping liquid and simultaneously regenerating the adsorbent for reuse, the improved method which comprises providing an additional mass of adsorbent constituting a guard zone, passing the liquid mixture through the mass of solid adsorbent in the guard zone to remove the minor proportions of very strongly adsorbed compounds present in the mixture prior to its passage into the adsorption zone, distilling the second effluent liquid from the adsorption zone to separate the stripping liquid and the adsorbate and periodically regenerating the adsorbent in the guard zone by contacting said adsorbent with adsorbate.

5. In a cyclic process wherein liquid mixtures of organic compounds containing minor proportions of very strongly adsorbed non-aromatic polar compounds are separated by contact with a solid adsorbent and the adsorbent is regenerated by contacting it with a stripping liquid, said process comprising a first step of passing said mixture into contact with a mass of solid adsorbent in an adsorption zone to separate an adsorbate comprised of the preferentially adsorbable components of the mixture and a first effluent liquid comprising the non-preferentially adsorbable components of the mixture and stripping liquid and a second step of passing a stripping liquid into contact with the mass of solid adsorbent in the adsorption zone to remove the adsorbate from the adsorbent producing a second effluent liquid comprising adsorbate and stripping liquid and simultaneously regenerating the adsorbent for reuse, the improved method which comprises providing an additional mass of solid adsorbent constituting a guard zone, passing the liquid mixture through the mass of solid adsorbent in the guard zone to remove minor proportions of very strongly adsorbed compounds present in the mixture prior to its passage into the adsorption zone, distilling the first effluent liquid from the adsorption zone to separate the stripping liquid and the non-preferentially adsorbable components of the mixture and periodically regenerating the adsorbent in the guard zone by contacting it with the non-preferentially adsorbable components of the mixture.

6. In a cyclic process for the separation of liquid organic mixtures containing minor proportions of very strongly adsorbed non-aromatic polar compounds wherein the liquid organic mixture is contacted with a first body of adsorbent in a guard zone to remove said strongly adsorbed compounds and then with a second body of adsorbent in an adsorption zone to separate an adsorbate and an effluent percolate, wherein the adsorbate is subsequently removed from the adsorbate in the adsorption zone and the adsorbent therein is simultaneously regenerated, the improvement which comprises periodically regenerating the first body of adsorbent by contacting it with adsorbate at an elevated temperature in the range of 200–500° F. to remove adsorbed polar compounds from the adsorbent, cooling the adsorbent by contacting it with a further quantity of adsorbate at a lower temperature, and then contacting the adsorbent with further quantities of the liquid organic mixture to effect the removal of said very strongly adsorbed compounds therefrom.

7. In a cyclic process for the separation of liquid organic mixtures containing minor proportions of very strongly adsorbed non-aromatic polar compounds wherein the liquid organic mixture is contacted with a first body of adsorbent in a guard zone to remove said strongly adsorbent compounds and then with a second body of adsorbent in an adsorption zone to separate an adsorbate and an effluent percolate, wherein a stripping liquid is subsequently passed into the adsorption zone and a mixture of adsorbate and stripping liquid is withdrawn therefrom, the improvement which comprises periodically regenerating the first body of adsorbent by first contacting it with the mixture of adsorbate and stripping liquid at an elevated temperature in the range about 200–500° F. to remove the very strongly adsorbed compounds from the adsorbent, then cooling the adsorbent by contacting it with a further quantity of the mixture of adsorbate and stripping liquid at a temperature substantially below that of the mixture of adsorbate and stripping liquid with which the adsorbent is first contacted and then contacting the adsorbent with further quantities of the liquid organic mixture to effect the removal of said very strongly adsorbed compounds therefrom.

8. In a cyclic process for the separation of liquid organic mixtures containing minor proportions of very strongly adsorbed non-aromatic polar compounds wherein the liquid organic mixture is contacted with a first body of adsorbent in a guard zone to remove said strongly adsorbent compounds and then with a second body of adsorbent in an adsorption zone to separate an adsorbate and an effluent percolate, periodically regenerating the first body of adsorbent by contacting it with a first quantity of percolate at an elevated temperature in the range about 200–500° F., cooling the adsorbent by contacting it with a further quantity of percolate at a temperature substantially below that of the first quantity of percolate, and then contacting the adsorbent with further quantities of the liquid organic mixture to effect the removal of said very strongly adsorbed compounds therefrom.

9. The method as defined in claim 1 wherein the mixture of liquid organic compounds is a petroleum distillate.

10. The method as defined in claim 2 wherein the mixture of organic compounds is a kerosene distillate.

11. The method as defined in claim 2 wherein the mixture of organic compounds is cracked naphtha.

12. The method as defined in claim 2 wherein the mixture of organic compounds is catalytically reformed naphtha.

13. The method as defined in claim 6 wherein the liquid organic mixture is kerosene distillate.

14. The method as defined in claim 6 wherein the liquid organic mixture is cracked naphtha.

15. The method as defined in claim 6 wherein the liquid organic mixture is catalytically reformed naphtha.

16. The method as defined in claim 2 wherein the mixture of liquid organic compounds is a petroleum distillate and the solid adsorbent in both masses of adsorbent are selected from the group consisting of silica gel, alumina gel, and silica-alumina gel.

17. The method as defined in claim 6 wherein the liquid organic mixture is a petroleum distillate and the solid adsorbent constituting both bodies of adsorbent is selected from the group consisting of silica gel, alumina gel, and silica-alumina gel.

18. The method as defined in claim 7 wherein the liquid organic mixture is a petroleum distillate and the solid adsorbent constituting both bodies of adsorbent is selected from the group consisting of silica gel, alumina gel, and silica-alumina gel.

19. The method as defined in claim 8 wherein the liquid organic mixture is a petroleum distillate and the solid adsorbent constituting both bodies of adsorbent is selected from the group consisting of silica gel, alumina gel, and silica-alumina gel.

20. In a cyclic adsorption process for the separation of liquid organic mixtures containing mminor proportions of very strongly adsorbed non-aromatic polar compounds into an adsorbate and a percolate, wherein a plurality of solid adsorbent masses are disposed in at least two serially interconnected groups, one group consisting of an adsorption zone and a second group constituting a stripping zone, wherein a hot stripping liquid is passed into the stripping zone to remove the adsorbate separated in previous cycles of operation from the adsorbent, and an effluent liquid comprising stripping liquid and adsorbate is withdrawn from the stripping zone, wherein the liquid organic mixture is passed into the adsorption zone to separate an adsorbate, and an effluent liquid comprising stripping liquid and percolate is withdrawn from the adsorption zone and wherein successive cycles are initiated by regrouping the adsorbent masses to transfer masses exhausted in the adsorption zone to the stripping zone and to transfer masses stripped in the stripping zone to the adsorption zone, the improvement which comprises passing the organic mixture through a mass of solid adsorbent constituting a guard zone to remove the minor proportions of very strongly adsorbed compounds from the mixture prior to its introduction into the adsorption zone, passing one of the liquids effluent from the adsorption zone into a distillation zone and there heating and distilling it to separate a stripping liquid fraction and a second fraction and periodically regenerating the adsorbent in the guard zone by contacting it with said second fraction while said fraction contains a substantial proportion of the heat acquired by it in the distillation zone.

SAM EAGLE.
JOHN W. SCOTT, Jr.

REFERENCES CITED

The following references are of record in the file of this patent:

UNITED STATES PATENTS

| Number | Name | Date |
| --- | --- | --- |
| 2,441,572 | Hirschler et al. | May 18, 1948 |
| 2,449,402 | Lipkin et al. | Sept. 14, 1948 |
| 2,459,442 | Lipkin | Jan. 18, 1949 |
| 2,509,486 | Danforth | May 30, 1950 |